March 7, 1967     F. P. JENKS ETAL     3,307,265
DISTANCE MEASURING BY FRICTION WHEEL INSTRUMENTS
Filed March 1, 1965
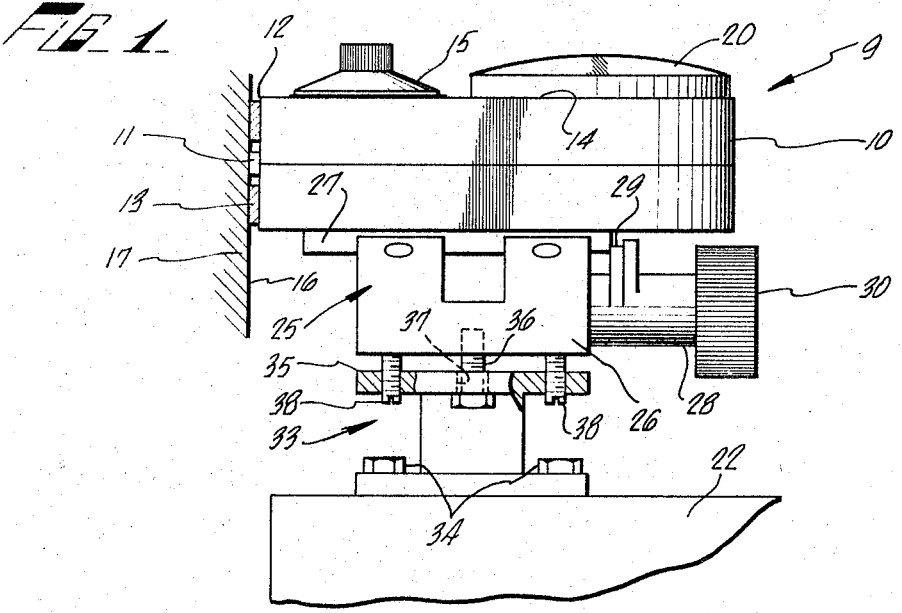
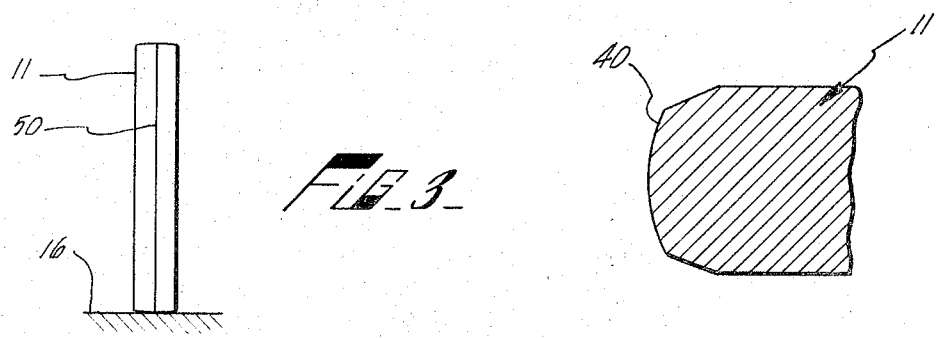
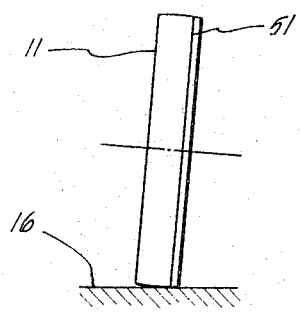
INVENTORS.
FREDERICK P. JENKS
BY EDWARD J. WILLIAMS
Christie, Parker & Hale
ATTORNEYS.

United States Patent Office 3,307,265
Patented Mar. 7, 1967

3,307,265
DISTANCE MEASURING BY FRICTION
WHEEL INSTRUMENTS
Frederick P. Jenks, Los Angeles, and Edward J. Williams, Woodland Hills, Calif., assignors, by mesne assignments, to Primus Mfg., Inc., San Lorenzo, Puerto Rico
Filed Mar. 1, 1965, Ser. No. 436,049
7 Claims. (Cl. 33—141)

This invention relates to distance measuring by an instrument having a frictionally rotated metering wheel forcibly engaged with a measurement surface along which the wheel rolls. This invention enables simple and accurate compensation of measurement errors produced by differences in the physical properties of the materials from which the wheel and the measurement surface are fabricated.

We have found that small errors are introduced into such friction wheel measuring instruments when the material (the host material) defining the measurement surface has physical properties different from the properties of the material from which the metering wheel is made. These errors are small and are proportional to the total distance the metering wheel moves along the surface.

We have found that all metals exhibit a gathering effect when a force is applied to a particular area of the metal. The amount of this gathering is a function primarily of the modulus of elasticity and the value of Poisson's ratio for the material. Poisson's ratio is a number which indicates the extent to which a metal will be deformed laterally of the direction in which a compressive or tensile force is applied. The value of Poisson's ratio varies from metal to metal, but is a constant for any given material. Measurement errors produced by differences in the gathering of the host material and the wheel are referred to herein as "metal gathering effect errors." This invention provides simple, effective and economical means for overcoming metal gathering effect errors in friction wheel measuring instruments.

Generally speaking, the invention is provided in conjunction with the combination of a measuring instrument and a metal surface with which the instrument is engaged. The instrument includes a circular metal metering wheel of precisely predetermined circumferential extent and means for rotatably mounting the wheel so that the wheel is in rolling engagement with the metal surface and for movement relatively along the surface. The combination also includes means for urging the wheel mounting means toward the surface so that the wheel frictionally engages the surface with sufficient force that the wheel rotates solely and faithfully in response to relative movement of the housing along the surface. The instrument includes an indicating mechanism operable in response to rotation of the wheel for precisely indicating the distance the wheel mounting means moves relative to the surface. The indicating mechanism is so coupled to the wheel that a predetermined degree of amplification of wheel mounting means movement (directly related to wheel rotation) is manifested by the indicating mechanism. In the environment just described, this invention provides means for compensating for metal gathering effect errors. The metering wheel is provided around its circumference with a surface which is convex radially outwardly of the wheel. When the plane of rotation of the wheel is normal to the measurement surface, the point of contact between the wheel and the surface lies on the greatest diameter of the wheel; this is the desired orientation of the wheel and is obtained when the wheel and the host material have essentially the same physical properties. The plane of rotation of the wheel is varied when these physical properties are different so that the point of contact of the wheel with the surface is on a diameter other than the maximum precisely predetermined diameter of the wheel.

The above mentioned and other features of the invention are more fully set forth in the following detailed description and explanation of the invention taken in conjunction with the acompanying drawing, wherein:

FIG. 1 is an elevation view of a friction wheel measuring instrument and a mounting mechanism therefor according to this invention engaged between a lathe carriage and a lathe bed;

FIG. 2 is a greatly enlarged cross-sectional elevation view of the portion of the metering wheel of the instrument shown in FIG. 1 adjacent periphery of the wheel;

FIG. 3 is a diagram of the geometrical relationship between the metering wheel and the measurement surface when the instrument is mounted in a situation not productive of metal gathering effect errors; and FIG. 4 is a diagram similar to FIG. 3 showing the relationship between the wheel and the surface to compensate for errors attributable to the metal gathering effect.

FIG. 1 shows a metal friction wheel measuring instrument 9 having a housing 10. The rim of a metering wheel 11 projects beyond a flat front face 12 of the housing through a felt wiper element 13. The metering wheel is circular and has a precisely predetermined circumferential extent. The diameter of the metering wheel is selected so that the maximum circumferential extent of the wheel is exactly 6 inches. Other wheel diameters can be used if desired. The 6 inch circumference was selected because it is convenient. Precision in the circumference of the wheel is the important point. The metering wheel is mounted in the housing on a rotatable shaft (not shown) which projects above an upper surface 14 of the housing. A first indicating dial 15 is mounted to the upper end of the metering wheel shaft and is calibrated to indicate inches and tenths of inches of instrument travel. The metering wheel is forcibly engaged with a measurement surface 16 defined by a lathe bed 17. The material from which the lathe bed is fabricated is a host material for the wheel.

Instrument 9 has a second indicator 20 mounted to the upper surface of the housing for indictaing thousandths of inches of instrument travel along surface 16. Indicator 20 includes a dial (not shown) and a rotatable pointer (not shown). The pointer is mounted on the upper end of a shaft (not shown) rotatably mounted in the housing parallel to the metering wheel shaft and connected to the metering wheel shaft by an anti-backlashed split geartrain (not shown). The geartrain amplifies rotation of the metering wheel by a factor of 60 and presents the amplified angular motion of the wheel to indicator 20 as the input via the shaft to which the rotatable pointer is connected.

Instrument 9 is mounted to a lathe carriage 22 by a mounting mechanism 25 which includes a mounting block 26 which cooperates with a guide member 27 secured to the bottom of housing 10. The guide member has its elongate extent disposed parallel to a line passing from the point of farthest extension of the metering wheel beyond housing face 12 through the axis of rotation of the metering wheel. The guide member defines a male element of a dovetail connection and the upper portion of block 26 defines the female element of a dovetail connection. Accordingly, the housing is sildably engaged in the block for movement toward and away from measurement surface 16 along a line normal to the surface. A tubular sleeve 28 extends from the rear of block 26 and defines a radial lug arm 29 engaged with the rear end of the guide member. A spring (not shown) is mounted inside the sleeve and urges lug arm 29 into engagement with the guide member. The bias of the spring is adjustable by operation of a knob 30. Preferably the knob is adjusted so that the force of engagement of metering wheel 11 with measurement surface 16 is approximately 40 lbs. It will be under stood, however, that this force is distributed over a very small area of the measurement surface and, therefore, the wheel and the host material are deformed in this area.

Block 26 is mounted on a pedestal 33 secured to the lathe carriage by a plurality of bolts 34. The pedestal has a top plate 35. A pair of bolts 36, only one of which is shown, are passed through enlarged holes 37 in the top plate into block 26 with threaded engagement approximately midway between the front and rear ends of the block, i.e., between the ends of the block 26 disposed adjacent to and opposite from the measurement surface. A pair of adjustment screws 38 are threadably engaged in the top plate adjacent the front and rear ends of block 26 and abut the underside of the block; screws 38 are not threaded into the block. Bolts 36 are tightened to draw the block toward the top plate of the pedestal, but before the undersurface of the block engages the top plate, the block is engaged by the upper ends of the adjusting screws. The adjusting screws are selectively adjusted so that the plane in which the metering wheel rotates is pivotable about a line parallel to the measurement surface.

Metering wheel 11 has a peripheral surface 40 (see FIG. 2) which is convex radially outwardly of the wheel. Preferably the surface is circularly curved and the profile of the wheel at its peripheral surface is the same at any location circumferentially of the wheel. In other words, the intersections of surface 40 with any two radial planes through the wheel will define identical curves. The maximum circumference of the wheel (at diameter 50 in FIG. 3) around surface 40 is the precisely predetermined circumference of the wheel.

Instrument 9 is mounted to the lathe carriage so that the metering wheel rotates in a plane normal to the measurement surface but parallel to the direction of relative movement between the carriage and bed 17. The instrument is so mounted before any correction is made for metal gathering effect errors. If such alignment of the metering wheel relative to the measurement surface is not obtained, measurement errors will be produced. Lug arm 29 is then engaged with the rear of the guide member and the bias of the mounting mechanism spring is obtained. Assuming that the host material and the metering wheel have identical physical properties, the instrument will operate in response to relative movement between the housing and surface 16 to provide accurate measurements of such movements.

On the other hand, if the host material has physical properties different from the material of the metering wheel, the instrument will not accurately indicate the amount of relative motion of the housing along the measurement surface. For a given instrument, the principal factors contributing to metal gathering effect errors are the modulus of elasticity and Poisson's ratio; other factors contribute to this error, but their significance is secondary.

Since the metering wheel in a friction wheel measuring instrument normally is fabricated of a high carbon or alloy steel having a high modulus of elasticity, measurement errors due to metal gathering effects become more significient the "softer" the host material becomes, i.e., the lower becomes the product the modulus of elasticity E of the host material and the value of Poisson's ratio $\mu$ for the same material. This has been confirmed by actual tests. For example, a measurement error of .001 inch per 6 inches of instrument travel was observed where the host material was cast iron. The error was .002 inch per 6 inches of instrument travel with bronze as the host material, and was .0035 inch where the host material was aluminum. It has been found that variations in the force with which the metering wheel is engaged with the measurement surface have relatively little effect on the magnitude of the measurement error attributable to the metal gathering effect.

Let it be assumed that a series of parallel marks are disposed at equal regular intervals on the measurement surface and on the surface of the metering wheel. In the area where the wheel is deformed by forcible engagement with the measurement surface due to three dimensional compressive forces, the spacing between the marks on the wheel is reduced. Similarly, where the measurement surface is deformed by the forcible engagement of the metering wheel with it, the spacing between the marks in the deformed area of the measurement surface is reduced; this is true since the deformed area of the measurement surface is a very small portion of a comparatively infinite body. If Poission's ratio and the modulus of elasticity of the wheel and host materials are identical, the alteration in the spacing of the marks on the wheel in the measurement surface will be identical. Accordingly, a given number of marks on the wheel will pass a corresponding number of marks on the measurement surface as the instrument is moved a fixed distance along the measurement surface. On the other hand, if the material of the wheel has a lower Poisson's ratio and/or a lower modulus of elasticity than the host material, the spacing between the lines on the measurement surface will be reduced more than the spacing between the lines on the wheel will be reduced. Accordingly, as the instrument moves a given distance along the measurement surface more marks on the measurement surface will pass the point of contact between the wheel and the measurement surface than marks on the wheel. Thus, the wheel will appear to travel less than it actually has. Accordingly, the instrument gives a reading smaller than the actual distance travelled when the wheel is "harder" than the host material. The nature of the error will be reversed when the wheel is "softer" than the host material. The total error is proportioned to the actual distance travelled. The error is the same in both directions of metering wheel movement along the measurement surface.

From the foregoing explanation of the metal gathering effect as it is now understood, it will be apparent that, when the wheel is harder than the host material, the error shown by the instrument is of the same nature as would be produced if the metering wheel were oversized. The amount the wheel appears to be oversized depends on the combination of materials involved in any given usage of the instrument. The convex profile on metering wheel 11, however, contributes to the provision of an instrument wherein the effective diameter of the metering wheel is variable. This characteristic provides compensation for metal gathering effect errors.

After instrument 9 is mounted to the lathe carriage so that the plane of rotation of the metering wheel is oriented normal to the measurement surface and parallel to the direction of movement of the instrument relative to the measurement surface (see FIG. 3) the instrument is moved a known distance relatively along the surface. Because of the small magnitude of the metal gathering effect error, the actual distance the instrument is moved must be known with accuracy. If the indication provided by the instrument of such movement does not accord with the actual amount the instrument is moved, the plane of metering wheel rotation is adjusted angularly relative to the measurement surface. This adjustment is accomplished by adjusting adjustment screws 38 relative to pedestal top plate 35 so that the plane of rotation of the metering wheel is pivoted about a line parallel to the direction of movement of the instrument along the measurement surface. Accordingly, the point of contact of the wheel with the measurement surface is moved from the maximum diameter 50 of the wheel to some point on a smaller diameter 51 of the wheel (see FIG. 4). Accordingly, the effective radius of the wheel is reduced. The angular adjustment of the wheel plane of rotation is continued until the point of contact of the wheel with the measurement surface is at a point which, when correlated to instrument travel, exactly offsets the metal gathering effect error. Stated in another way, the effective diameter of metering wheel is varied to compensate for the metal gathering effect error.

In a presently preferred instrument 9, the metering wheel has a maximum circumferential extent of 6 inches. The wheel has a width of 0.120 inch. The radius of curvature of wheel rim surface 40 is 3.60 inches. As the instrument housing is tilted through an angle of about one degree, the point of contact of the wheel with the measurement surface moves from the center of surface 40 to the edge of the wheel. Over this range the radius of the wheel is reduced by .0005 inch. This variation is sufficient to permit compensation of any metal gathering effect error up to .0031 inch per 6 inches of travel of the instrument. Moreover, this configuration allows full use of the radiused profile of the wheel rim surface without unduly loading felt wiper 13. If the housing is tilted too much, a substantial portion of the load imposed on the housing by spring in the mounting mechanism is absorbed in the felt. When this happens, the wheel may slip relative to the measurement surface as the instrument is moved relatively along the surface.

It will be apparent that the means described above for compensating for metal gathering effect errors in friction wheel measuring instruments is useful whether or not the ultimate indication of metering wheel rotation is provided by an indicator coupled directly to the metering wheel shaft or to the metering wheel shaft via a motion amplifying geartrain.

While the invention has been described above in conjunction with specific apparatus, this has been by way of example and is not to be considered as limiting the scope of this invention. Those skilled in the art will recognize that this invention has utility in devices other than the specific instrument described above.

What is claimed is:

1. In a measuring instrument having a circular metal metering wheel of precisely predetermined circumferential extent, means for rotatably mounting the wheel so that the periphery of the wheel is engaged in rolling engagement with a metal surface along which measurements are to be made and for movement relatively along the surface, means for urging the wheel mounting means toward the surface so that the wheel frictionally engages the surface with sufficient force that the wheel rotates solely and faithfully in response to relative movement of the wheel mounting means along the surface, and means operable in response to rotation of the wheel for indicating precisely the distance the wheel mounting means moves relative to the surface, the improvement comprising a peripheral surface on the metering wheel curved convexly radially outwardly of the wheel about the circumference of the wheel, said radially outwardly convex curvature having a radius of curvature in cooperation with the extent of the peripheral surface axially of the wheel sufficient that the plane of rotation of the wheel is pivotable about a line parallel to the measurement surface to vary, by an amount adequate to compensate for localized deformation phenomena in the wheel and the measurement surface, the effective circumference of the wheel relative to said precisely predetermined circumferential extent.

2. In a measuring instrument having a circular metering wheel of precisely predetermined circumferential extent rotatably mounted in a housing with its periphery extending outwardly therefrom for rolling engagement with a surface along which distance measurements are to be made, means for mounting the instrument for movement relatively along the surface, means for urging the housing toward the surface so that the wheel frictionally engages the surface with sufficient force that the wheel rotates solely and faithfully in response to relative movement of the housing along the surface, and means operable in response to rotation of the wheel for indicating precisely the distance the housing moves relative to the surface, the instrument being mounted so the metering wheel rotates in a plane normal to the surface and parallel to the direction of relative movement of the instrument along the surface, the improvement comprising a circumferential surface on the wheel defining a maximum circumference and curved convexly radially outwardly of the wheel, and means for moving the housing so that the plane of metering wheel rotation is pivoted about a line in said plane parallel to the surface along which measurements are to be made, said radially outwardly convex curvature being sufficient in combination with the extent of the peripheral surface axially of the wheel that the housing is pivotable about said line to vary, by an amount adequate to compensate for localized deformation phenomena in the wheel and the measurement surface, the effective circumference of the wheel relative to said precisely predetermined circumferential extent without engaging the housing with the measurement surface sufficiently to interfere with the operation of said urging means.

3. Apparatus according to claim 2 wherein the means for moving the housing is a component of the instrument mounting means.

4. In a measuring instrument having a circular metering wheel of precisely predetermined circumferential extent rotatably mounted in a housing with its periphery extending outwardly therefrom for rolling engagement with a surface of the machine tool and the like, means for mounting the instrument to the tool for movement relative to the surface so that the wheel rotates in a plane normal to the surface and parallel to the direction of relative movement between the housing and the surface, means for urging the housing toward the surface so that the wheel frictionally engages the surface with sufficient force that the wheel rotates solely and faithfully in response to relative movement of the housing along the surface, and means operably connected to the wheel and operable in response to rotation of the wheel to indicate precisely the distance the housing moves relative to the surface, the improvement in means for compensating for measurement errors occasioned by relative differences in the metal gathering effect between the wheel and the measurement surface comprising a curve convex away from the wheel axis of rotation defined at the intersection of the peripheral surface of the wheel with a radial plane through the wheel parallel to and including the wheel axis, the intersections of the peripheral surface with all such radial planes through the wheel defining identical curves, and means for angularly adjusting the plane of rotation of the wheel relative to the tool surface for varying the point along said curves at which the wheel contacts the tool surface while maintaining said plane of wheel rotation parallel to said direction of relative movement, said intersectional curves being curved sufficient in cooperation with the axial extent of said peripheral surface that the effective circumference of the wheel relative to said precisely predetermined circumferential extent is variable, by angular adjustment of the wheel plane of rotation, sufficiently to compensate for said relative differences in the metal gathering effect.

5. Apparatus according to claim 4 wherein said intersectional curves are of equal circular curvature.

6. A measuring instrument having a circular metering wheel of precisely predetermined maximum circumferential extent rotatably mounted in a housing with its periphery extending outwardly therefrom for rolling engagement with a surface of a machine tool and the means for mounting the instrument for movement relative to the surface, means for urging the housing toward the surface so that the wheel frictionally engages the surface with sufficient force that the wheel rotates solely and faithfully in response to relative movement of the housing along the surface, means operable in response to rotation of the wheel to indicate the distance the housing moves relative to the surface, the metering wheel having a circumferential surface which at the intersection thereof with any plane radially through the wheel parallel to and including the wheel axis defines a line curved convexly away from the wheel, all such intersectional curves being identical, and means cooperating with the mounting means for angularly adjusting the plane of rotation of the wheel relative to the tool surface about a line parallel to the direction of movement of the housing relative to the tool surface for varying the location on said curves at which the wheel contacts the tool surface, said intersectional curves being curved sufficient in cooperation with the extent of said peripheral surface axially of the wheel that the effective circumference of the wheel relative to said predetermined circumferential extent is variable, by said angular adjustment of the wheel plane of rotation, sufficiently to compensate for localized deformation phenomena in the wheel and the tool surface in the area of engagement therebetween.

7. In the combination of a measuring instrument having a circular metering wheel of precisely predetermined circumferential extent rotatably mounted in a housing with its periphery extending outwardly therefrom for rolling engagement with a surface of a machine tool and the like, means for mounting the instrument to the tool for movement relatively along the surface, means for urging the housing toward the surface so that the wheel frictionally engages the surface with sufficient force that the wheel rotates solely and faithfully in response to relative movement of the housing along the surface, and means operable in response to rotation of the wheel for precisely indicating in selected units of linear measure the distance the housing moves relative to the surface, the method of compensating for measurement errors occasioned by different values of modulus of elasticity and Poisson's ratio in the materials from which the wheel and a member defining the surface are fabricated, the method including the steps of providing the metering wheel with a peripheral surface which in a plane radially of the wheel parallel to and including the wheel axis is curved convexly radially away from the wheel, and mounting the instrument so that the wheel rotates in a plane parallel to the direction of relative movement of the instrument along the surface and the point of contact of the wheel with the tool surface is displaced radially inwardly of said precisely predetermined circumference by an amount proportional to the value of a selected relationship between the values of modulus of elasticity and Poisson's ratio for said materials, said radially outwardly convex curvature of the peripheral surface in combination with the extent of the peripheral surface axially of the wheel being sufficient that the point of contact of the peripheral surface may be displaced radially inwardly of said predetermined circumference an amount sufficient to compensate for differences in localized deformation of the peripheral surface and the tool surface in the area of engagement therebetween.

References Cited by the Examiner

UNITED STATES PATENTS 1,134,924    4/1915    Snow _____ 33—129

LEONARD FORMAN, *Primary Examiner.*

J. M. FREED, *Assistant Examiner.*